(12) United States Patent
Eitzenberger

(10) Patent No.: US 12,085,201 B2
(45) Date of Patent: Sep. 10, 2024

(54) PIPE CONNECTION

(71) Applicant: PFW AEROSPACE GMBH, Speyer (DE)

(72) Inventor: Berthold Eitzenberger, Ludwigshafen am Rhein (DE)

(73) Assignee: PFW AEROSPACE GMBH, Speyer (DE)

( * ) Notice: Subject to any disclaimer, the term of this patent is extended or adjusted under 35 U.S.C. 154(b) by 41 days.

(21) Appl. No.: 17/905,355

(22) PCT Filed: Mar. 4, 2021

(86) PCT No.: PCT/EP2021/055443
§ 371 (c)(1),
(2) Date: Aug. 31, 2022

(87) PCT Pub. No.: WO2021/175982
PCT Pub. Date: Sep. 10, 2021

(65) Prior Publication Data
US 2023/0129427 A1    Apr. 27, 2023

(30) Foreign Application Priority Data
Mar. 5, 2020   (DE) ............ 10 2020 105 910.8

(51) Int. Cl.
*F16L 23/18*     (2006.01)
*F16L 23/032*    (2006.01)

(52) U.S. Cl.
CPC ............ *F16L 23/18* (2013.01); *F16L 23/032* (2013.01)

(58) Field of Classification Search
CPC ....... F16L 23/032; F16L 23/036; F16L 23/04; F16L 23/08; F16L 23/16; F16L 23/162;
(Continued)

(56) References Cited

U.S. PATENT DOCUMENTS 660,862 A * 10/1900 Lovekin ............... F16L 23/032
285/368
4,326,737 A   4/1982 Lehmann
(Continued)

FOREIGN PATENT DOCUMENTS

| DE | 3005790 A1 | 9/1980 |
|---|---|---|
| DE | 4231084 A1 | 3/1994 |

(Continued)

*Primary Examiner* — Aaron M Dunwoody
(74) *Attorney, Agent, or Firm* — Browdy and Neimark, PLLC

(57) ABSTRACT

The invention relates to a pipe connection (10, 52, 66) with a first pipe part (12) and a second pipe part (14), with at least one multi-part sealing ring (24; 44, 46) or at least one single-part sealing ring (68) which is surrounded by a clamping device (16). The pipe parts (12, 14) each comprise a first obliquely or vertically extending end face (20, 72) or a second obliquely or vertically extending end face (22, 74). These are overlapped by a clamping device (16). This applies an outwardly acting radial force (34) to the at least one single-part sealing ring (68) or the at least one multi-part sealing ring (24; 44, 46). These are secured in their respective sealing position by means of an enclosing geometric triangle, by means of an enclosing geometric non-rectangular quadrilateral (104) or by means of an enclosing geometric rectangular quadrilateral (106).

20 Claims, 8 Drawing Sheets

(58) Field of Classification Search
CPC . F16L 23/18; F16L 23/20; F16L 23/22; F16L 17/06; F16L 17/067; F16L 17/08
See application file for complete search history.

(56) References Cited

U.S. PATENT DOCUMENTS

| | | |
|---|---|---|
| 5,188,400 A | 2/1993 | Riley et al. |
| 9,851,033 B2 | 12/2017 | Bachmann et al. |

FOREIGN PATENT DOCUMENTS

| | | |
|---|---|---|
| DE | 19700481 A1 | 7/1998 |
| DE | 10239682 A1 | 3/2004 |
| DE | 60319649 T2 | 4/2009 |
| EP | 2817549 B1 | 4/2016 |
| EP | 3066375 B1 | 1/2018 |
| GB | 1004702 A | 9/1965 |
| GB | 2097880 A | 11/1982 |

\* cited by examiner

PIPE CONNECTION

TECHNICAL FIELD

The invention relates to a pipe connection, wherein the pipe connection is formed from at least two pipe parts. Furthermore, the invention relates to the use of the pipe connection, in particular in an aircraft.

STATE OF THE ART

DE42 31084 A1 relates to a pipe connection. A screwable pipe connection is proposed to improve the handling, to reduce the construction volume, while at the same time providing an adequate sealing effect, and to increase the operational safety. This comprises moulded parts arranged at the ends of the pipes to be connected, which are screwed together by means of a socket. The abutting end faces of the moulded parts are characterised by a profile that acts in a form-fitting manner to prevent rotation, so that one moulded part carries a profile and the other carries a complementary counter-profile. The threaded sections of the moulded part as well as the other moulded part intended for a screw connection are each designed in the manner of a left-hand or right-hand thread, so that in connection with corresponding threaded sections of the socket, a rotary movement of the latter results in a corresponding axial sliding movement of the moulded parts directed in opposite directions. The end faces of the moulded parts are each provided with a ring-like formed recess part, wherein both recess parts complement each other in the assembled state to form a recess accommodating a flat sealing ring. The flat sealing ring is thus located between two axially oriented sealing surfaces.

EP 3 066 375 B1 relates to a device for coaxially connecting two pipelines and a disconnection arrangement. A screw flange for the introduction of the pipelines has an external thread. A pressure flange for the other pipeline comprises a pressure surface for a nut. Furthermore, a sealing ring is provided, which is arranged in a recess between the opposite end faces of the screw flange on the one hand and the pressure flange on the other hand. A nut has an internal thread and is pushed onto the pressure flange and can be screwed onto the screw flange. The internal diameter of the sealing ring is larger than or at least the same size as the internal diameter of the pipelines, wherein the difference in the internal diameters of the pipelines is compensated for by a respective cone area of the pressure flange and a respective cone area of the screw flange. Around its entire external circumference, the sealing ring comprises spread legs pointing radially outwards in the form of a V-profile.

EP 2 817 549 B1 relates to a component connector for connecting cylindrical components. The component connector is used to connect two pipes that represent the cylindrical components. The component connector also comprises a fixing sleeve, which is formed in the shape of a hollow cylinder. For its part, the fixing sleeve comprises axially formed slots which are distributed in the circumferential direction and are arranged on the end faces of the fixing sleeve. These axial slots provide the radial deformability of the fixing sleeve during the assembly operation.

DE 197 00 481 A1 relates to a pipe coupling for conveying liquid media. A pipe coupling is disclosed which is provided to convey liquid media, in particular water, dirty water or other high-pressure media which may contain dirt particles. The pipe coupling is designed as a bayonet coupling and has a coupling pin with retaining claws which engage under associated, radially inward projecting flange inserts in a coupling sleeve. The coupling pin can be locked in the coupling sleeve by an associated safety device.

In the connection of pipes by fittings, additional precautions in the form of holding devices and guide devices are still required today which prevent the pipes to be connected with each other from twisting in relation to each other during ongoing use and predetermine a defined position of the twisting of the pipe parts connected with each other in relation to each other during installation. Furthermore, during the forming of pipe connections, care must be taken to ensure that pipe parts at the pipes to be connected are always paired with mutually complementary geometries and that the individual parts that are joined together at the pipe connection are not mixed up.

DESCRIPTION OF THE INVENTION

According to the invention, a pipe connection is proposed with a first pipe part and a second pipe part, with at least one multi-part sealing ring or at least one single-part sealing ring, each of which is surrounded by a clamping device. The pipe parts each comprise a first vertically or obliquely extending end face and a second vertically or obliquely extending end face, which is overlapped by the clamping device, which applies an outwardly acting radial force to the at least one single-part sealing ring or the at least one multi-part sealing ring, which are secured in their respective sealing position by means of an enclosing geometric triangle or by means of an enclosing geometric quadrilateral.

In a further development of the pipe connection proposed according to the invention, the single-part sealing ring or the multi-part sealing ring is provided with a wedge-shaped cross-section, a rectangular cross-section, a circular cross-section or an oval cross-section.

Seals having a wedge-shaped cross-section for oblique sealing surfaces with angles above a self-locking have circumferential one or more interruptions and therefore deviate radially outwards under axial pressure by means of the obliquely extending sealing surfaces and thereby increase their circumference, wherein this is limited by the clamping device. For this reason, with oblique sealing surfaces, which circumferential result in a cone, there is a mandatory radial contact between a seal, fitting and clamping ring, when an axial clamping force is applied, due to the bevels of the clamping ring and seal, which always extend in opposite directions with regard to their angles, in relation to the respective contact surfaces of the fittings. Tightness at the separation points of the sealing points is achieved by a special shape of overlapping, which allows a free change in circumference. The free change in the circumference of the seal causes the geometrically axial alignment of the pipe parts during assembly of the pipe connection, wherein the flanges are sealed in a forced manner and always fixed planar to each other. A double wedge-shape of a clamping ring and sealing element results in higher sealing pressures and a better seal, compared to seals using a simple wedge-shape of clamping rings with a planar seal. If for the wedge-shaped seal cross-section a material is used, which has sufficient elasticity, the necessary increase in circumference for the described function is also made possible with an embodiment of the seal without a circumferential interruption solely by means of its elastic circumferential extension.

In the pipe connection proposed according to the invention, the single-part sealing ring or the multi-part sealing ring can advantageously be designed of PTFE, plastic material with or without fibre reinforcement, rubber, plastic material with portions of metal material, metal-reinforced rubber seals or as a purely metallic seal.

To extend the positive properties of wedge-shaped seals, a wedge-shaped seal without a interruption provides an angular compensation but with a circumferential reinforcement in the form of a metal or fibre insert that resists stretching. As a result, pipe connections can be fixed, the fittings of which are not oriented planar to each other, and can be connected to each other in a stress-free, sealing manner using the solution proposed according to the invention. To do this, the external circumference of the seal should be smaller than the internal circumference of the mounted clamping ring. The seal must not be supported on the clamping ring, which is why the reinforcement absorbs the tensile force generated by an axial pressure tangential to the circumference. A radial position of the seal and the clamping device relative to each other is oriented in opposite directions when the angle is compensated, so that the seal on the side of the pipe connection with a larger distance between the sealing surfaces moves inwards to the pipe axis, while the clamping device at this point moves outwards radially away from the pipe axis. On the other hand, at the radially opposite side with a correspondingly reduced distance between the sealing surfaces, the sealing ring slips radially outwards from the pipe axis, while the clamping device at this point moves inwards in the direction of the pipe axis. If pipes or pipe parts that are not completely aligned are connected in this way, an axial angle deviation between the pipe parts to be connected is compensated for by uniform contact of the obliquely extending sealing surfaces with radial opposite displacement of the seal and the clamping ring to each other while complete sealing is provided and thus an impermissibly high mechanical tension in the pipe system as well as in the seal during assembly is avoided. The stress-free angular compensation is limited by the radial contact of the seal outwards to the clamping ring and inwards to the guide elements of the fittings for the rotational fixation or rotational positioning of the individual pipe parts with respect to each other.

In a further embodiment of the solution proposed according to the invention, the pipe connection comprises a single-part sealing ring or a multi-part sealing ring which is designed as a metal ring with a wedge-shaped cross-section with crowned sealing surfaces or as a flat seal with a rectangular cross-section. The flat seal has a planar rectangular cross-section without interruption and is only suitable for sealing surfaces that are oriented vertically to each other. It is simpler and less expensive to manufacture compared to seals with a wedge-shaped cross-section. It seals without interruption in the case of aligned pipe parts with a defined deformation of the cross-section until the axial stops of both fittings rest on the opposite side for rotational fixation by means of the contraction of the clamping device and the pipe parts have aligned themselves in relation to each other. A wedge angle of 0° is therefore very well suited for this embodiment, particularly with permanently elastic seal material such as plastic or rubber. Circular or oval cross-sections can also be used in the same way, wherein an even further improved seal can be achieved, especially with roughened sealing surfaces, by means of their linear bearing surfaces, sealing surfaces and the resulting easier deformability of the sealing cross-section by means of axial pressure during assembly. The intended use of such seals is in particular for less stressed and less pre-stressed pipe connections.

In the pipe connection proposed according to the invention, a wedge angle is formed when a wedge-shaped cross-section is formed at the single-part sealing ring or at the multi-part sealing ring, so that a first sealing surface and a second sealing surface are present on the single-part sealing ring or the multi-part sealing ring, which extend obliquely according to the wedge angle.

In a particularly advantageous embodiment of the wedge-shaped cross-section, the wedge angle is between 5° and 30°, most preferably between 10° and 15°. It is desirable that the wedge angle is in a range above the self-locking, based on the coefficient of friction of the material pairing between the seal surface and the sealing surface. If the coefficient of friction is below the self-locking value, the seal cannot slide outwards under axial pressure from the contraction of the oblique sealing surfaces of the flanges due to the contraction of the clamping ring until it makes radial contact with the clamping ring, which radially moves towards the seal during assembly by means of the opposite oblique surfaces of the flange clamping surfaces.

In the pipe connection proposed according to the invention, a first sealing ring half and a second sealing ring half are provided, each having a first sealing ring half end and a second sealing ring half end, the geometries of which are designed complementary to each other. As a result, assembly can be simplified, and there are also tolerances during assembly, which make it easy to handle the production of the pipe connection proposed according to the invention.

With regard to the sealing ring halves, the respective ends of the sealing ring halves can be guided into each other in such a way that during assembly, before tightening clamping devices, there is a first gap and a second gap. The two ends of the sealing ring halves are assembled during pre-assembly in such a way that the respective ends of the sealing ring halves lie against each other along a common bearing surface. During subsequent bracing, the ends of the sealing ring halves are radially displaced such that when the axial force is applied, the first gap and the second gap are closed until the sealing ring halves rest radially on the clamping ring and the sealing effect is fully established. This creates a balance of forces between the sealing ring halves, fittings and clamping rings in the axial and radial end position.

In the pipe connection proposed according to the invention, projections and recesses can be depicted in an alternative embodiment at one or both of the mutually facing ends of the pipe parts in the circumferential direction in an alternating sequence, which form a complementary geometry in relation to each other. The recesses extending in the circumferential direction or the projections extending in the circumferential direction can be designed in a uniform grid pattern along the mutually facing ends of the pipe parts to be connected, so that several twisting positions are possible between them. However, if the projections and recesses are formed distributed non-uniformly over the circumference of the first pipe part and the second pipe part in the circumferential direction at the mutually facing ends of the pipe parts, i.e., at their end faces, the two pipe parts to be joined can only be joined in a twisted position. In both cases the fittings to be connected, i.e., pipe parts, are identical with regard to the arrangement of projections and recesses, so that identical fittings can be mounted at all pipe ends to be connected; this simplifies the assembly of the pipe components and the production of the pipe connection proposed according to the invention.

It is possible to form six projections and six recesses at the mutually facing ends of the pipe parts to be connected within the scope of the pipe connection, for example in the circumferential direction, which are each designed in a 30°-division. In addition, the complementary geometry could also be formed such that, for example, five projections and five recesses are formed at the pipe parts to be joined together, viewed in the circumferential direction, so that there is a 36°-division; there is the possibility of arranging four projections and four recesses in the circumferential direction, so that a 45°-division of the same is realised. If, on the other hand, only three projections and three recesses are produced on the mutually facing end faces of the first pipe part and the second pipe part, then the result is a 60°-division, whereas if two projections and two recesses are formed, there is a 90°-division. The spacing, i.e., the design of the complementary geometry can represent, from the provision of two projections and two complementary recesses, the function of rotational fixation with a division of four times 90° and additionally the function of rotational positioning with non-uniform angles, for example twice 100° and twice 80, of the identical flanges to be connected to each other. The formation of a smaller spacing for larger flange diameters is possible and facilitates the handling of the pipe parts during assembly when producing the pipe connection proposed according to the invention.

The pipe connection proposed according to the invention can also be used when only limited axial compression is necessary or possible. In this case, a single-part sealing ring is used, which preferably has a rectangular cross-section. The single-part sealing ring having the rectangular cross-section rests on a first vertically extending end face and on a second vertically extending end face opposite thereto. Due to the rectangular geometry of the single-part sealing ring, axial compression with elastic seal material can be implemented with this embodiment. The complementary geometry of projections and recesses in an alternating sequence in the circumferential direction supports the single-part sealing ring radially inwards and, on the other hand, causes the formation of an anti-twist device for the two pipe parts to be connected to each other proposed within the scope of the pipe connection proposed according to the invention.

With regard to the pipe connection proposed according to the invention, at least one clamp or at least one bridge for suspending the pipe parts with a first clamp head and a second clamp head per tension ring can be used at an exterior wall of each of the pipe parts connected to each other within the scope of the pipe connection, by means of which tension rings are fixed at the circumference of the pipe connection.

In a further development of the solution proposed according to the invention, the tension rings comprise a first end and a second end, which are each designed thickened and provided with a screw head counterpart geometry, which serves to prevent the screw head from twisting and thus saves having to counteract the tightening torque when tightening.

In a further development of the solution proposed according to the invention, the cross-section of the tension rings can also be designed as clamping rings for connecting the pipe ends and thus not only attach the pipe string to the surrounding structure of the aircraft but also connect the pipe ends, which reduces the number of components required.

In the pipe connection proposed according to the invention, a wire-shaped measuring element extends along the exterior wall of the two pipe parts which are joined and sealed to each other within the scope of the pipe connection. The wire-shaped measuring element is installed continuously across all connected pipes after all pipe connections have been closed. This means that it can be retrofitted in all holders along the pipe system and in the sensor housings at every pipe connection without tools by means of elastic closures.

In the pipe connection proposed according to the invention, the wire-shaped measuring element, which is, for example, a heat-sensitive light guide, is protected against damage from the outside by one or more adhesively bondable or mountable foam covers having a slotting in the longitudinal direction for receiving the wire-shaped measuring element.

The invention also relates to the use of the pipe connection with a first pipe part and a further second pipe part when used in an aircraft.

Advantages of the Invention

The pipe connection proposed according to the invention allows the longer use of sensitive materials for seals even under rough operating conditions, since the seal is protected, supported and secured in its sealing position in all embodiments. This is done by completely enclosing the surfaces of the clamping ring or the flanges, in particular in the direction of the possibly hot, pressurized and chemically aggressive media that flow inside the pipe of the pipe connections.

The pipe connection proposed according to the invention allows the use of a single pipe part variant for each selected pipe diameter, since several projections and recesses are distributed in the circumferential direction in each of the pipe parts produced according to the invention. If these projections or recesses are made uniformly in the circumferential direction at the end faces of the pipe parts to be connected to each other as part of the pipe connection, the twisted position of the pipe parts relative to each other can be indexed during installation. This means that several twisting positions are available. If, on the other hand, these areas, i.e., the pipe parts to be joined together within the scope of the pipe connection proposed according to the invention, are formed non-uniform in the circumferential direction at the end faces, it is alternatively possible to realise an unambiguous twisting position of the two pipe parts with respect to each other during installation.

With the solution proposed according to the invention, no further precautions are required in order to define the exact twisting positions of the two pipe parts to be joined together. In particular, with the solution proposed according to the invention, the provision of two different pipe part geometries in the design and in the production is obsolete.

The represented variants of the pipe connection proposed according to the invention, either with vertically or obliquely extending sealing surfaces, with seals that move radially outwards up to the stop at the clamping device, guarantee axial alignment of the pipes or pipe parts connected in this way during assembly. In the case of pipes with the same flanges and obliquely extending sealing surfaces, a stress-free and seal-friendly assembly at an angle deviating from the axial alignment of the connected pipes can only be achieved by using a different type of seal, which is closed circumferentially and is not or only slightly stretchable due to circumferential reinforcements. The selection of the corresponding type of seal for the respective application can thus be made also just during the final assembly of the pipe parts and the production of the pipe connection proposed according to the invention, so that unexpected geometric deviations in the pipe system can be compensated for at short notice.

The pipe connection proposed according to the invention allows the use of tension rings with the cross-section of the clamping rings for connecting the pipe ends. In addition to fastening the pipe string to the surrounding structure of the aircraft, the pipe ends can also be connected with just one component while retaining the described advantages of all variants of the seals and flange shapes. This reduces the number of components required. In this case, the axial position of the structure connection and the axial position of the pipe connection must match but the radial position of the structure connection can be freely selected with a circular pipe geometry.

BRIEF DESCRIPTION OF THE DRAWINGS

With reference to the drawing, the invention is described in more detail below.

It is shown in.

EMBODIMENTS OF THE INVENTION

Figure 1:
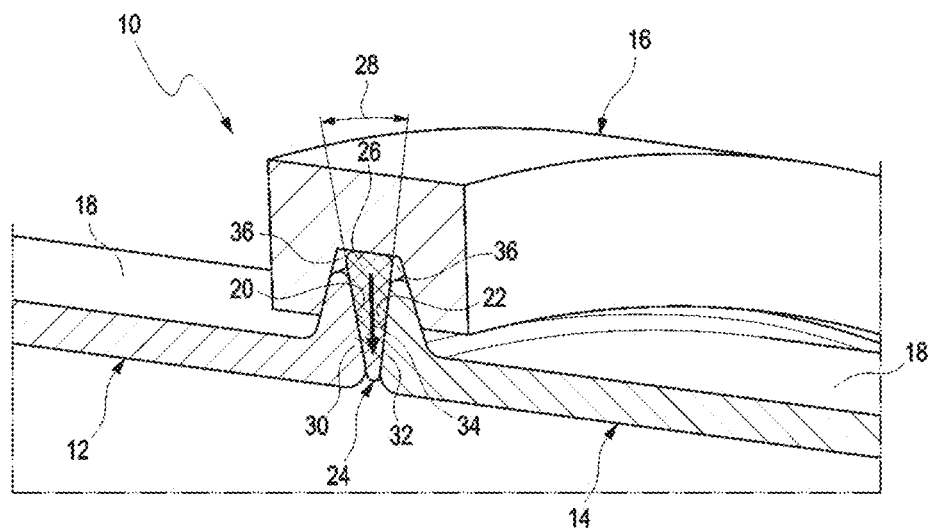
FIG. 1 a first embodiment ("NOGuideVersion") of the pipe connection proposed according to the invention in a perspective view, FIG. 2 a section through the pipe connection according to the illustration in FIG. 1, FIG. 3 a detail of a multi-part sealing ring in the area of its sealing ring half ends, FIG. 4 a perspective top view of the multi-part sealing ring, FIG. 5 a perspective view of a second embodiment ("GuideVersion") of the pipe connection proposed according to the invention, FIG. 6 a partial interior view of a pipe part with projections or recesses illustrated spaced at the end face and an obliquely extending sealing surface, FIG. 7 a detailed view of the interior of the joined pipe connection according to the second embodiment, FIG. 8 a detailed view of a vertically extending sealing surface for a flat seal, FIG. 9 a third embodiment ("FlatVersion") with a flat, single-part sealing ring, FIG. 10 a detailed view of the third embodiment of the pipe connection proposed according to the invention, FIG. 11 a perspective view of a clamp for fixing a tension ring at the circumference of the pipe connection, FIG. 12 a bridge with a first clamp head and a second clamp head, FIG. 13 the perspective view of a tension ring, FIG. 14 a temperature sensor at the external circumference of the pipe connection according to the invention, and FIG. 15 an assembly drawing of all components of the pipe connection according to the invention.

The illustration according to FIG. 1 is a perspective representation of the first embodiment of the pipe connection proposed according to the invention.

At a first pipe connection 10, a first pipe part 12 and a second pipe part 14 are connected to each other and sealed. For this purpose, a ring-shaped clamping device 16 encloses an exterior wall 18 in the area of a first end face 20 of the first pipe part 12 and a second end face 22 in relation to the second pipe part 14. It can be seen from the illustration according to FIG. 1 that between the first end face 20 and the second end face 22, a sealing ring 24 is accommodated. The sealing ring 24 is a multi-part sealing ring which comprises a first sealing ring half 44 and a second sealing ring half 46. In the embodiment according to FIG. 1, the multi-part sealing ring 24 has a wedge-shaped cross-section 26. A wedge angle 28 is in the range between 5° and 30°, preferably between 10° and 20°. Due to the wedge angle 28, in which the wedge-shaped cross-section 26 is formed at the multi-part sealing ring 24, a first lateral sealing surface 30 and a second lateral sealing surface 32 extend inclined. The inclination of the first sealing surface 30 and the second sealing surface 32 preferably corresponds to an inclination which the first end face 20 at the first pipe part 12 and the second end face 22 at the second pipe part 14 have.

At its open side facing the end faces 20, 22, the clamping device 16 has bevels which are complementary to the bevels of the first end face 20 of the first pipe part 12 and the second end face 22 of the second pipe part 14. When tensioning the clamping device 16 in the tangential direction, a radial force 34 is transmitted to the sealing ring 24 by the radial contact with the clamping device 16, which forces the multi-part sealing ring 24 with its sealing surfaces 30, 32 between the first end face 20 and the second end face 22, so that the sealing ring 24 is fixed in the area of a parting joint of the first pipe part 12 and the second pipe part 14 in a geometric triangle of the contact surfaces and seals the pipe connection. FIG. 1 also shows that a head space 36 remains between the upper area of the multi-part sealing ring 24 and the recess within the clamping device 16, which can be used, for example, to accommodate a heat sensor or, in the embodiment shown, serves to collect leaks along the seal, in order to feed them in a concentrated manner to a heat sensor, which is laid parallel to the axis of the pipe, at the intersection of the seal and the heat sensor.

Figure 2:
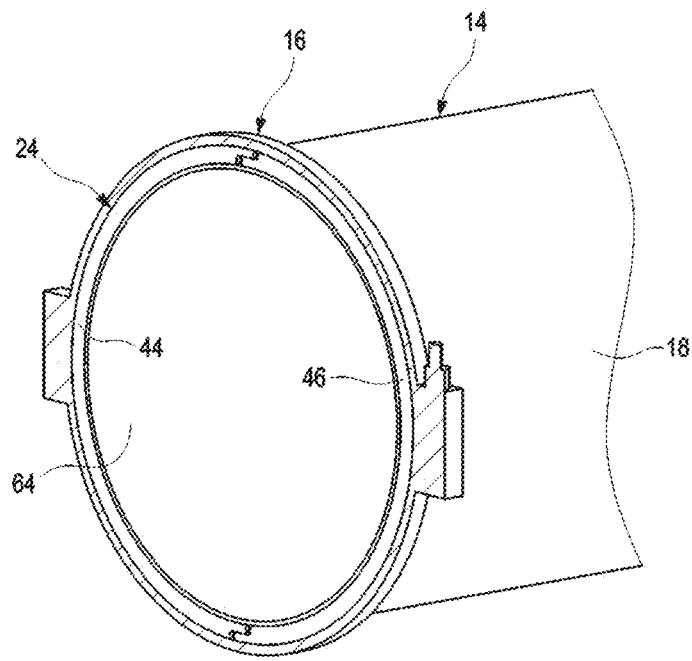

FIG. 2 also shows a perspective view of a part of the first pipe connection according to the perspective illustration in FIG. 1.

The perspective illustration according to FIG. 2 shows that the multi-part sealing ring 24 comprises the first sealing ring half 44 and the second sealing ring half 46. According to FIG. 2, these are enclosed by the clamping device 16.

Figure 3:
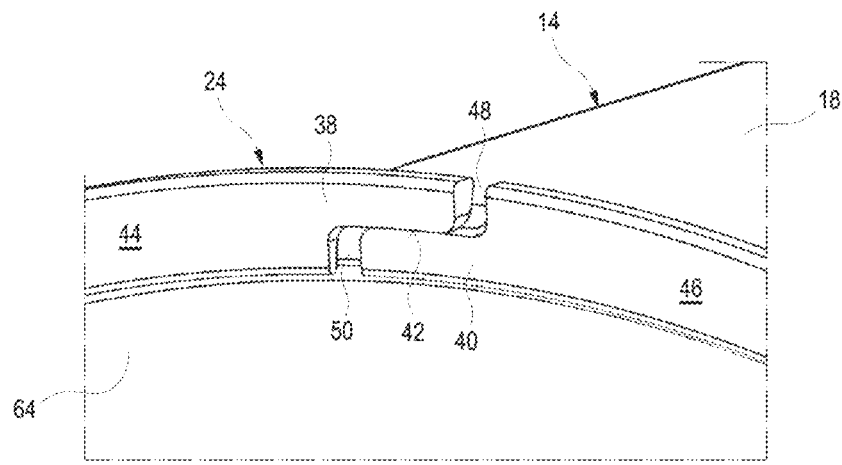

The detailed view according to FIG. 3 shows the sealing ring half ends 38, 40, which occupy the positions shown in FIG. 3 in relation to each other in the sealing position during pre-assembly. The sealing ring half ends 38, 40 abut against each other along a bearing surface 42 and form a first gap 48 and a second gap 50 at the respective other of the sealing ring half ends 38, 40.

If the clamping device 16 is radially tensioned, when a force is introduced into it, the respective sealing ring halves 44, 46 slide radially outwards until they come into contact with the clamping device 16, wherein the first gap 48 and the second gap 50, respectively, are widened for the increased circumference and the contact is correspondingly shortened without losing the sealing effect, since, also in these overlapping areas of the seals, the wedge-shaped cross-section of both seals together is pressed outwards up to the abutment against the clamping device 16 and thus ensures contact. The illustration according to FIG. 2 shows that the sealing ring half ends 38, 40 are formed in a 180°-division, i.e., they are lying opposite each other with respect to the circumference of the clamping device 16.

Figure 4:
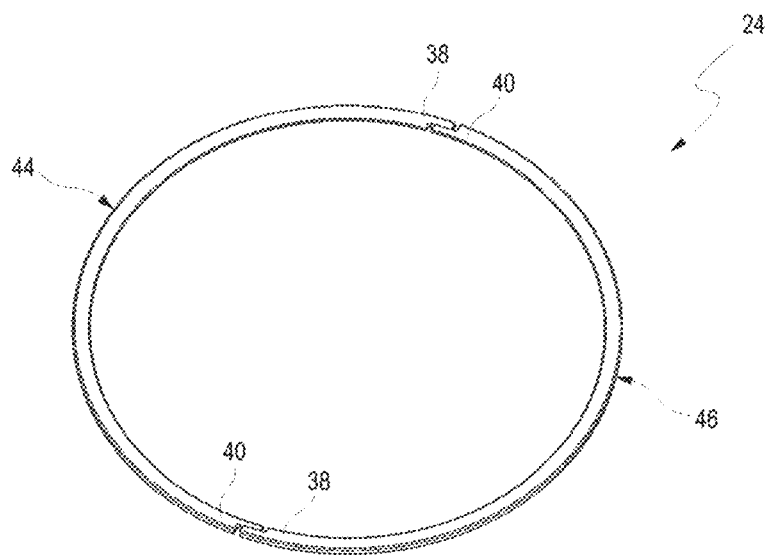

FIG. 4 shows a top view of the multi-part sealing ring 24 with the first sealing ring half 44 and the second sealing ring half 46. The illustration in FIG. 4 shows the sealing ring 24, which in this case is formed by two parts and has a wedge-shaped cross-section 26. The illustration according to FIG. 4 corresponds essentially to the illustrations in the preceding FIGS. 2 and 3, only the diameter of the sealing ring 24, which is formed by two parts here, is slightly changed due to the complementary geometry 58 at the end faces of the pipe parts 12, 14, cf. illustration according to FIG. 5. Since, according to FIG. 5, the multi-part sealing ring 24 is an enclosing geometric non-rectangular quadrilateral 104, so that a significant change in the diameter of the multi-part sealing ring 24 is not possible, the use of a single-part wedge-shaped seal results in a guaranteed seal under higher internal pressure of the pipe connection compared to a multi-part sealing ring 24.

Figure 5:
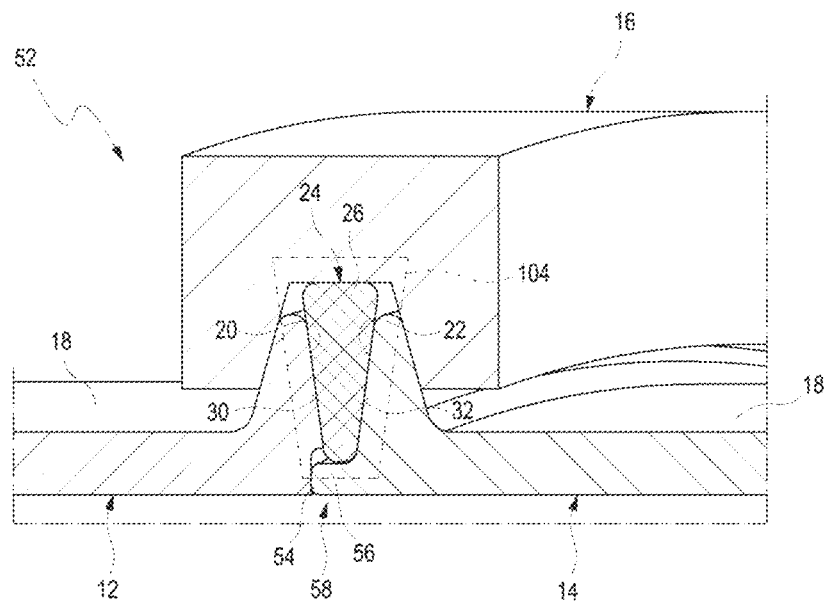

FIG. 5 shows a further, second embodiment of the pipe connection proposed according to the invention.

It can be seen from FIG. 5 that in a second pipe connection 52 a complementary geometry 58 is designed at the first end face 20 or at the second end face 22. This comprises projections 54 and recesses 56 (compare FIG. 6). FIG. 5 shows that, for example, the projection 54 is provided at the second pipe part 14 and engages in a opposite complementary recess 56 below the first end face 20 of the first pipe part 12. The respective projections 54 or recesses 56 formed are the complementary geometry 58. In the case of the second pipe connection 52, too, the clamping device 16 presses on the upper side of the sealing ring 24, which is here formed by multiple parts, and places this with its respective first sealing surface 30 and its second sealing surface 32 against the obliquely formed first end face 20 of the first pipe part 12 and the obliquely formed end face 22 of the second pipe part 14.

Reference numeral 104 designates an enclosing geometric non-rectangular quadrilateral, within which the single-part or multi-part sealing ring 24, 68 fixes the wedge-shaped cross-section 26 in its sealing position between the clamping device 16 as well as the two obliquely extending end faces 20,22 and the alternating projections 54 of the pipe parts 12 and 14.

Figure 6:
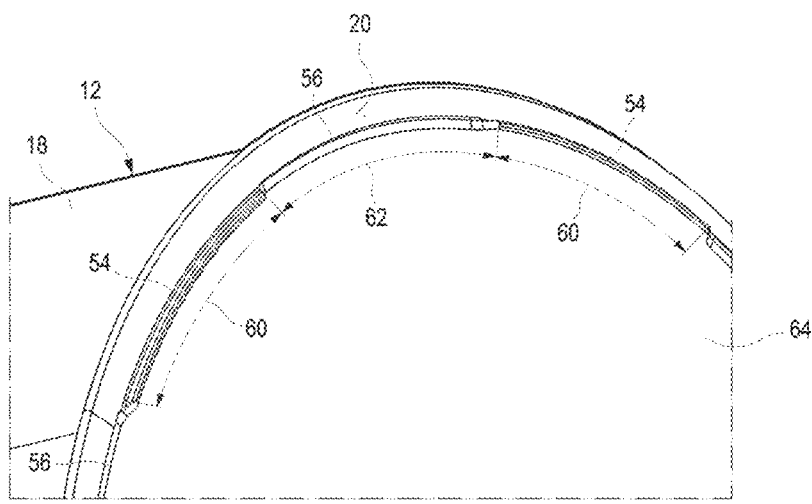

FIG. 6 shows a perspective interior view of a first pipe part 14 at the end face of which the complementary geometry 58 is designed. The perspective view according to FIG. 6 shows that, viewed in the circumferential direction of the exterior wall 18 of the first pipe part 12, projections 54 extend in the circumferential direction, to which in turn a recess 56 extends, to which in turn a projection 54 extends, and so on. In the embodiment according to FIG. 6, i.e., within the scope of the second pipe connection 52, for example, seen in the circumferential direction of the first pipe part, six projections 54 are formed at 30° at the circumferential part 60 and six 30°-projections are formed at the circumferential part 62 with respect to the recess 56. This means that on both end faces of the first pipe part 12 and the second pipe part 14 in the circumferential direction alternately six projections 54 and six recesses 56 extend, respectively. Since they are arranged uniformly, they can be joined in any twisted position in relation to each other within the scope of the complementary geometry 58. Alternatively, of course, there is also the possibility of forming a different number of projections 54 and recesses 56 within the scope of alternative complementary geometries 58 at the respective end faces of the first pipe part 12 and the second pipe part 14. For example, viewed in the circumferential direction of the pipe parts 12, 14, five projections 54 and five recesses 56 could be implemented in an alternating sequence, resulting in a division of 36°. Alternatively, there would also be the possibility of forming four projections in each case on the opposite end faces of the first pipe part 12 and the second pipe part 14 and in an alternating sequence to these four recesses 56 in the circumferential direction, which in this case would be designed with a 45°-division, for example. Furthermore, three projections 54 and three recesses 56 could be formed at the end faces of the two pipe parts 12, 14 lying opposite each other in an alternating sequence with a 60°-division. Finally, there would also be the possibility of providing two projections 54, which alternate with two recesses 56, on the mutually facing end faces of the first pipe part 12 and the second pipe part 14, so that there would be a 90°-division. If, on the other hand, an non-uniform distribution of projections 54 and recesses 56 is selected, viewed in the circumferential direction, the two facing end faces of the first pipe part 12 and the second pipe part 14 can only be assembled together in a single set defined rotational position. If, on the other hand, the end faces of the two pipe parts 12, 14 to be joined together are designed to be evenly spaced, as explained above, then all twisting positions in relation to the two pipe parts 12, 14 relative to each other can be realised within the spacing.

Figure 7:
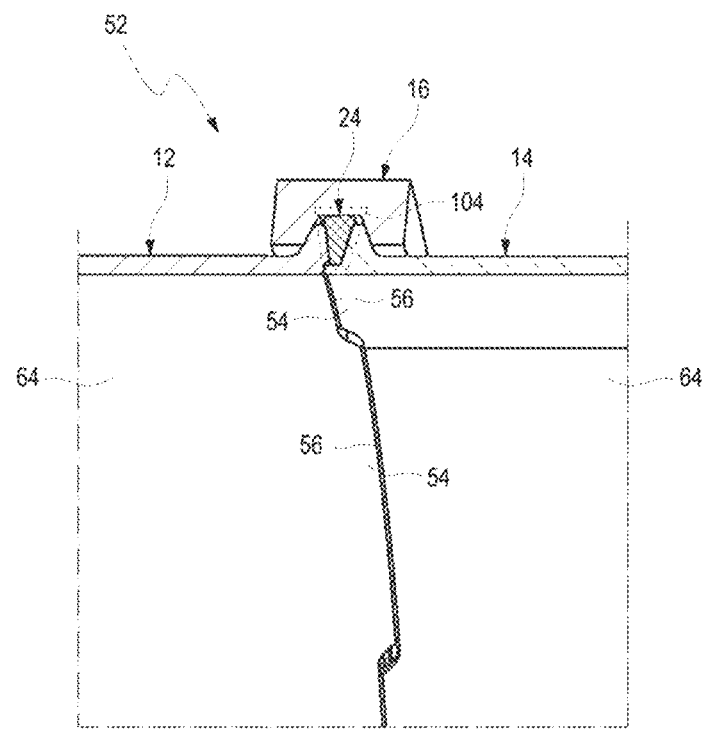

FIG. 7 shows an interior view of the second pipe connection 52.

It can be seen from FIG. 7 that in the area of a parting joint at the interior wall 64 of the first pipe part 12 and of the second pipe part 14, projections 54 engage in the respective recess 56 and vice versa. The parting joint extending in the interior wall 64 as shown in FIG. 7 forms. The two pipe parts 12, 14 according to FIG. 7 are connected to each other within the scope of the second pipe connection 52. By clamping device 16, which encloses the multi-part sealing ring 24, a radial force is exerted on it, which presses the single-part or multi-part sealing ring 24, 68 between the mutually facing first and second end faces 20, 22 of the first pipe part 12 and of the second pipe part 14. Position 104 in turn designates the enclosing geometric non-rectangular quadrilateral which is formed by the interior of the clamping device 16 and by the obliquely extending end faces 20,22 at the pipe parts 12, 14 as well as the projection 54 of the complementary geometry 58.

Figure 8:
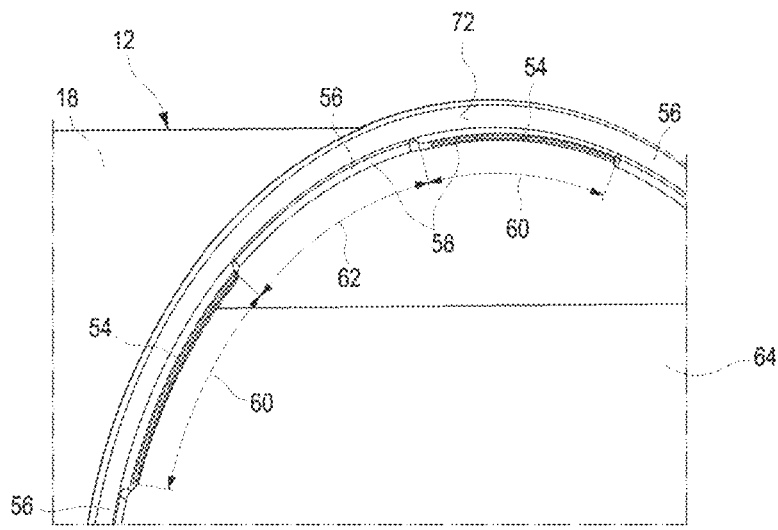

The illustration according to FIG. 8 shows the complementary geometry 58. This comprises projections 54 arranged in an alternating sequence as well as recesses 56 corresponding to these, which are formed on the pipe parts 12, 14 forming the pipe connections proposed according to the invention. As seen in FIG. 8, a 30°-circumferential part 60 corresponding to protrusion 54 is shown complementing a 30° circumferential part 62 relative to a recess 56. When the first pipe part 12 is joined to the second pipe part 14, the complementary geometry 58, as indicated in FIG. 8, forms an anti-twisting device or positional fixation of the first pipe part 12 with respect to the second pipe part 14. Reference numeral 72 in the illustration according to FIG. 8 indicates a first vertical end face of the first pipe part 12, which merges into the exterior wall 18.

Figure 9:
Figure 10:
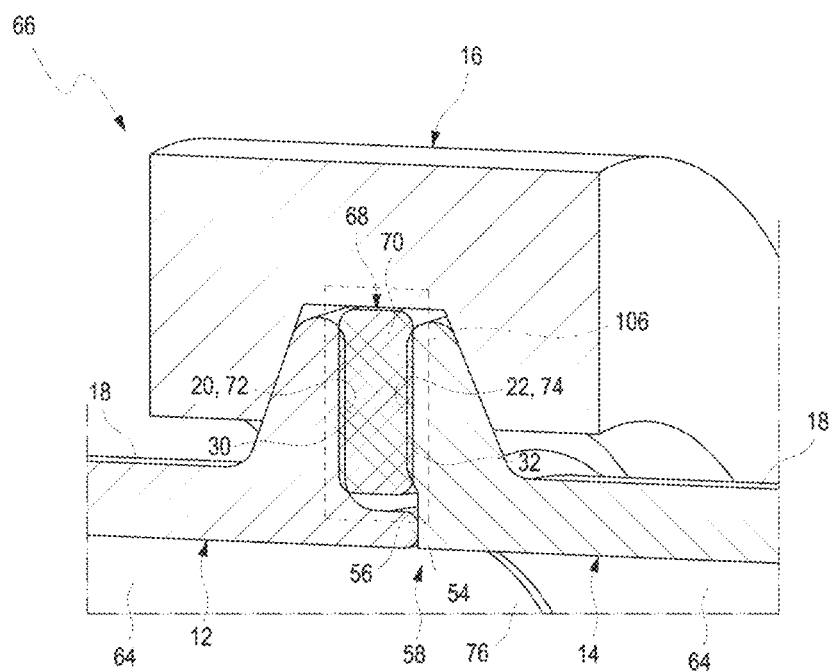

FIG. 9 shows a perspective plan view of a single-part, closed sealing ring 68. This serves to seal a third pipe connection 66, as is illustrated by way of example in FIG. 10. The illustration according to FIG. 10 shows a third embodiment of the pipe connection proposed according to the invention in the form of a third pipe connection 66. The third pipe connection 66 shown in FIG. 10 is preferably selected when a limited space is available for axial compression as part of the production of a third pipe connection 66. In contrast to the embodiments described above, the closed single-part sealing ring 68 used here has a rectangular cross-section 70. The single-part sealing ring 68 is made of a material such as PTFE, for example, and has a cross-sectional area of 5 mm×2 mm. In contrast to the first pipe connection 10 and the second pipe connection 52, in the third pipe connection 66 as illustrated in FIG. 10, the first end face 20 and the second end face 22 of the first pipe part 12 and of the second pipe part 14 are provided with vertically extending flanks 72 and 74, respectively. In contrast to the inclined extending end faces 20,22 according to the first pipe connection 10 and the second pipe connection 52, in the third pipe connection 66 illustrated in FIG. 10 the longitudinal sides of the single-part sealing ring 68 abut against the vertically extending flanks 72, 74 of the first end face 20 and the second end face 22. In addition, below the single-part sealing ring 68, the projections 54 or recesses 56 formed on the first pipe part 12 or the second pipe part 14 abut against each other and form a parting joint 76 in the interior wall 64 of the two pipe parts 12, 14 connected to each other within the scope of the third pipe connection 66. Similar to the first pipe connection 10 and the second pipe connection 52, the clamping device 16 applies a radial force to the single-part sealing ring 68, which forces this into the space between the first vertical flank 72 at the first end face 20 of the first pipe part 12 and the second vertically extending flank 74 of the second end face 22 of the second pipe part 14, so that the seal at the parting joint 76 is provided. In the illustrated design of a third pipe connection 66, the tensioning of the clamping device 16 does not result in any outward radial force on the single-part closed sealing ring 68 due to the vertical end faces 72, 74, so that the projections 54 have the task of, on the one hand, preventing the single-part sealing ring 68 or areas of the single-part sealing ring 68 from falling inwards into the flow of the medium and thereby contaminate or slow down the medium transported through the third pipe connection 66 and, on the other hand, limiting the deformation of the elastic single-part sealing ring 68 by axial pressure by the projections 54 in the opposite recesses 56 and thus protecting the single-part sealing ring 68 from damage during assembly. A further task of the projections 54 abutting in the recesses 56 in the described embodiment of the third pipe connection 66 is the transmission of external axial forces from the first pipe part 12 to the second pipe part 14 and vice versa, and thereby to protect the elastic single-part sealing ring 68 from these additional axial pressure loads and to axially reinforce the third pipe connection 66 despite the use of the elastic single-part sealing ring 68. According to FIG. 10, an enclosing geometric rectangular quadrilateral 106 results due to the vertical end faces 72, 74 of the pipe parts 12, 14.

Figure 11:
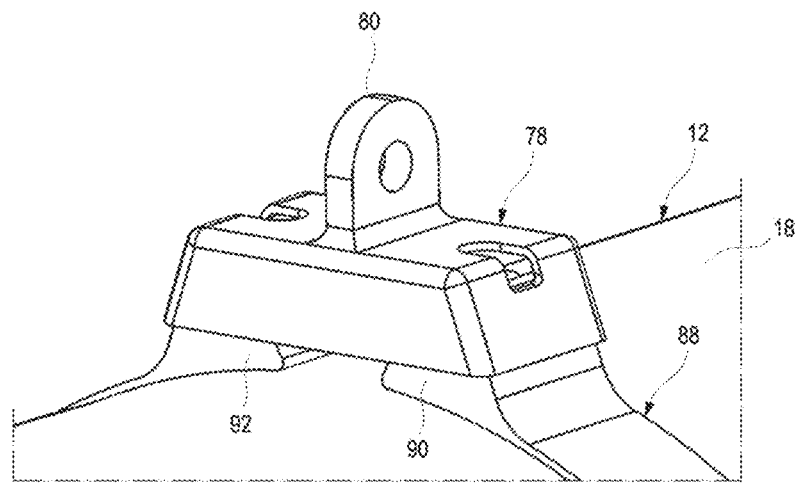
Figure 12:
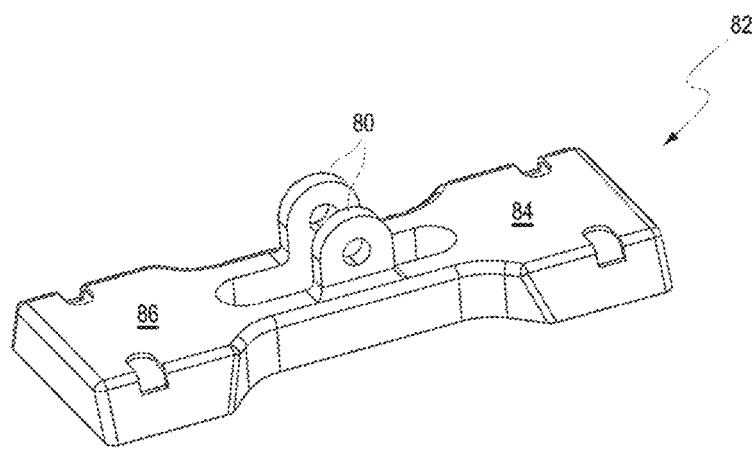

The illustration in FIG. 11 shows a clamp 78 which has a connection point 80 which is formed in the shape of an eyelet. FIG. 12 shows a perspective view of a bridge 82 for larger or predominantly axial holding forces at the circumference of the exterior wall 18, which has a reinforced connection point 80 analogous to the clamp 78 at its upper side and also has a first clamp head 84 and an opposite second clamp head 86 for two axially offset tension rings 88 which are provided at the exterior wall 18.

Figure 13:
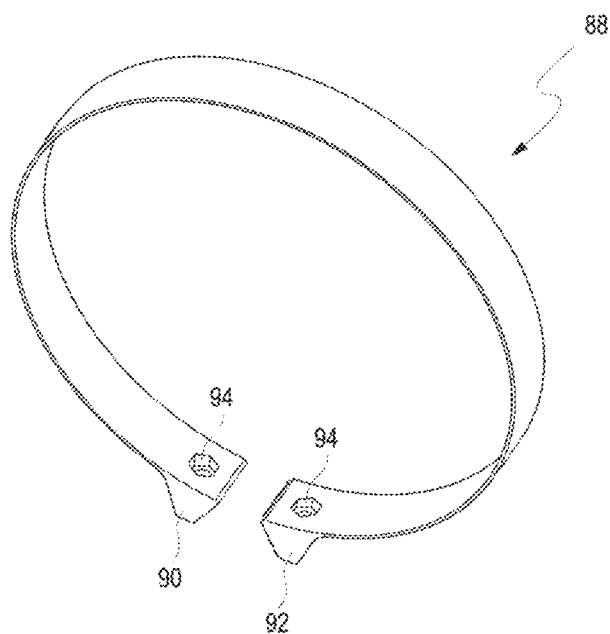

With the clamps 78 or bridges 82 shown in perspective view in FIGS. 11 and 12, tension rings 88, as shown in FIG. 13 in perspective view, can be fixed to the circumference of the exterior wall 18 of each of the pipe connections 10, 52 or 66 in any position and rotation, which unifies and simplifies the pipe sections of complex attached pipes. FIG. 13 also shows that a first end 90 and a second end 92 of the tension ring 88 are designed thickened. Screw head counterpart geometries 94 are embedded in the thickened first ends 90 or second ends 92. These make the use of a tool for counter-holding when producing a screw connection superfluous, since the counter-holding force for the screw connecting element is applied by the screw head counterpart geometry 94. First and second ends 90, 92 of the tension rings 88 are wedge-shaped, which shortens the tension ring 88 until it clamps on the exterior wall 18 when tightening assembly nuts on the upper side of the clamp 78 or the bridge 82. This function of the tension ring 88 is similar to the function of the clamping ring 16, which is why the functions of both rings can also be combined in one design in order to save on components and weight. For this purpose, the tension ring 88 is not designed flat on the circumference as in FIG. 13 but has the cross-section of the clamping ring 16 as in FIG. 1, 5, 7 or 10.

Figure 14:
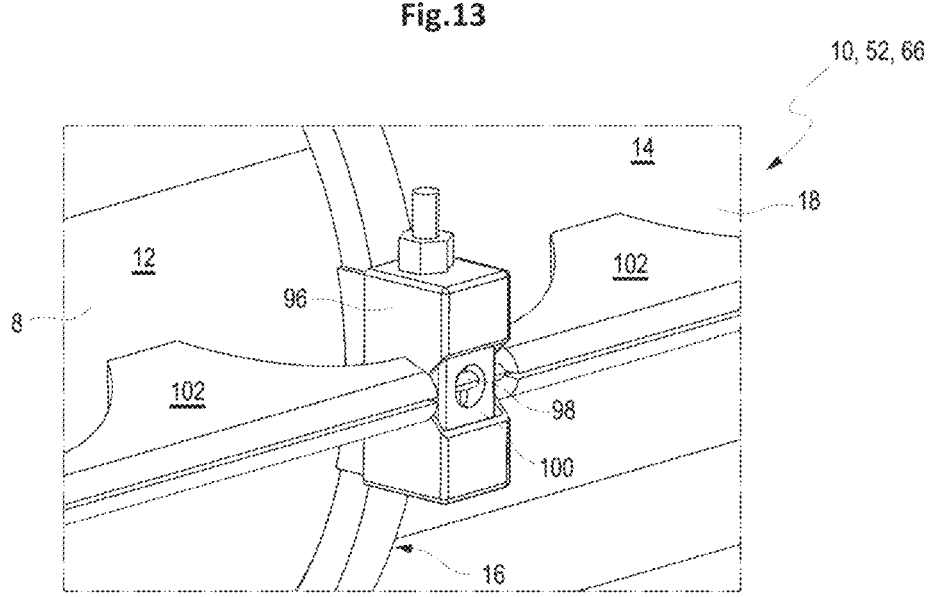

FIG. 14 shows a schematic arrangement of a temperature sensor which is located outside at the circumference of a first pipe connection 10, a second pipe connection 52 or a third pipe connection 66. A sensor housing 96 of the temperature sensor is preferred, which is fastened by means of the clamping device 16 which extends in the circumferential direction of the exterior wall 18, as shown in FIG. 14. For the arrangement of the temperature sensor, it is irrelevant whether the clamping device 16 is part of the first pipe connection 10, the second pipe connection 52 or the third pipe connection 66 for connecting the first pipe part 12 to the second pipe part 14. FIG. 14 shows that a wire-shaped measuring element 98 extends through the sensor housing 96. This wire-shaped measuring element 98 extends through an elastic sensor holder 100, which is made of silicone, for example, while the sensor housing 96 can be a plastic injection moulded part. FIG. 14 shows that the wire-shaped measuring element 98 is covered, fixed and protected by foam covers 102 on both sides of the sensor housing 96. The foam covers 102 are plastic components which have a slot-shaped opening which extends essentially in the longitudinal direction and into which the wire-shaped measuring element 98 to be protected can be pressed or pushed. The foam covers 102 are held on the exterior wall 18 of the first pipe part 12 or of the second pipe part 14, so that the wire-shaped measuring element 98 remains in its original position and is not exposed to any mechanical stress. Furthermore, the wire-shaped measuring element 98 is protected against environmental influences, such as the high temperature of the connected pipes, and damage by the snap-on foam covers 102 and only triggers a signal if, due to seal failure, hot exhaust air collects under the clamping ring 16 and escapes to the outside through the sensor housing 96 and the sensor holder 100 passing the wire-shaped measuring element 98, for example, a heat-sensitive light guide. The assembly of the wire-shaped measuring element 98 can advantageously be carried out without tools after the installation of all pipe connections across those, in the foam covers 102 and the elastic sensor holders 100, in order to monitor the tightness of all involved pipe connections at the same time.

Figure 15:
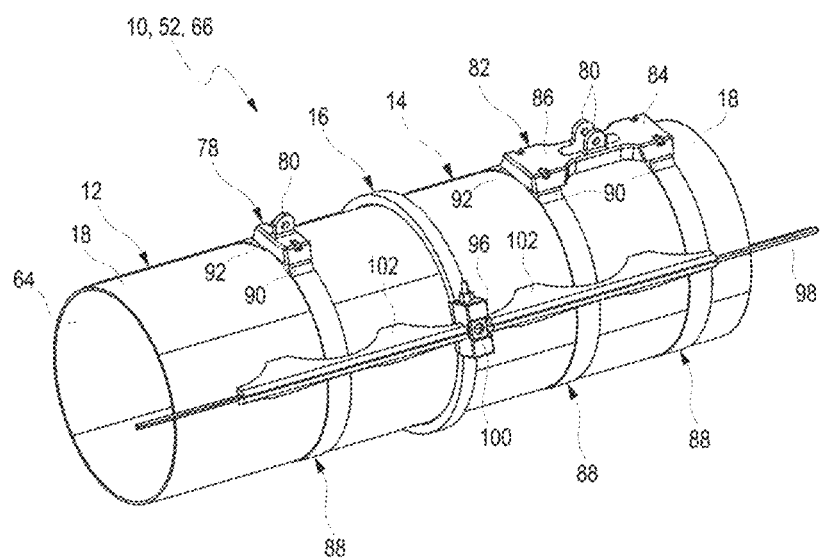

FIG. 15 shows an assembly drawing of the pipe connection proposed according to the invention, whether it is the first pipe connection 10, the second pipe connection 52 or the third pipe connection 66.

FIG. 15 shows that the first pipe part 12 and the second pipe part 14 are connected to each other by the clamping device 16. The sensor housing 96 of a temperature sensor, already explained above in connection with FIG. 14, is located at the clamping device 16. The wire-shaped measuring element 98 already mentioned in connection with FIG. 14 extends parallel to the pipe axis of the first pipe part 12 and the second pipe part 14 through the sensor housing 96 of the temperature sensor. On both sides of the sensor housing 96, the wire-shaped measuring element 98 is protected against environmental influences by foam covers 102, which are supported by the exterior wall 18 of the first pipe part 12 and the second pipe part 14, respectively.

FIG. 15 also shows that the tension ring 88 extends around the pipe part 12, the ends 90, 92 of which are connected by the clamp 78. Analogous to this, the two tension rings 88 which enclose the exterior wall 18 of the second pipe part 14 are connected to each other by the bridge 82. This comprises the first clamp head 84 and the second clamp head 86, wherein each of the two clamp heads 84, 86 fixes and tensions one of the tension rings 88. The two eyelet-shaped connection points 80 enable the first pipe connection 10 or second pipe connection 52 or third pipe connection 66 illustrated in FIG. 15 to be fixed in the respective installation space, wherein, in a simplified design, the eyelet-shaped connection points 80 could also be integrated into the clamping ring 16 in order to combine the functions of holding the pipe and creating a tight pipe connection in one component and thus to reduce the number of components required.

FIG. 14 shows a combination of clamping device 16 and a pipe connection 10, 52, 66 with an additional function and a seal, since even with radial contact between the seal and clamping device 16, two air ducts enclosing the pipe connection 10, 52, 66 remain, possibly as a completely enclosing collector of exiting hot air with the sensor housing as a local hot air outlet, through which the wire-shaped measuring element 98 is passed. FIGS. 11 to 13 show axially displaceable holders of the pipe parts 12, 14, which compensate for a deviation from the planned course of the pipe due to structural deviations of the pipe parts 12, 14 or the surrounding structural holders, which are mounted stress-free, with an angle-compensating sealing variant without additional effort by axially displacing tension rings 88 relatively to the pipe during the assembly of the pipe parts 12, 14 and the surrounding structural holders, also tension-free. FIG. 15 shows all assembly possibilities of the variants according to FIGS. 11 to 14 in synopsis. A relation to the pipe connection 10, 52, 66 is that the advantages of the pipe connection/seal variants can also be expanded for a sensor assembly or for a structural connection in the aircraft.

The anti-rotation device and rotational positioning by means of projections 54 and recesses 56 is designed so that only one variant of the pipe parts 12, 14, i.e., of the flanges, is required for a pipe connection 10, 52, 66, since this can snap into itself. The use of male/female flanges can thus be avoided, so that simplified flange manufacture and flange assembly, i.e., a simplification of the assembly of the pipe parts 12, 14 results.

The clamping ring, i.e., the clamping device, is also used as a circumferential collector of unwanted exhaust air in the event of leaks in the area of the pipe connection 10, 52, 66. In the event that deviations in the course of the pipe or structural connections cannot be compensated for, tension-free assembly can be carried out without additional effort using axially displaceable tension rings 88.

The invention is not limited to the embodiments described herein and the aspects highlighted therein. Rather, within the scope indicated by the claims, a variety of variations are possible which are within the scope of skill in the art.

LIST OF REFERENCE SIGNS

10 First pipe connection
12 First pipe part
14 Second pipe part
16 Clamping device
18 Exterior wall
20 First oblique end face
22 Second oblique end face
24 Multi-part sealing ring
26 Wedge-shaped cross-section
28 Wedge angle
30 First sealing surface
32 Second sealing surface
34 Radial force
36 Head space
38 First sealing ring half end
40 Second sealing ring half end
42 Bearing surface
44 First sealing ring half
46 Second sealing ring half
48 First gap
50 Second gap
52 Second pipe connection
54 Projection
56 Recess
58 Complementary geometry
60 30°-projection of the circumferential part
62 30°-recess of the circumferential part
64 Interior wall
66 Third pipe connection
68 Single-part sealing ring
70 Rectangular cross-section
72 First vertical end face
74 Second vertical end face
76 Butt joint
78 Clamp
80 Connection point (eyelet)
82 Bridge
84 First clamp head
86 Second clamp head
88 Tension ring
90 First end
92 Second end
94 Screw head counterpart geometry
96 Sensor housing
98 Wire-shaped measuring element
100 Sensor holder
102 Foam cover
104 Enclosing geometric non-rectangular quadrilateral
106 Enclosing geometric rectangular quadrilateral

The invention claimed is:

1. A pipe connection with a first pipe part and a second pipe part, with at least one multi-part sealing ring or at least one single-part sealing ring, which is surrounded by a clamping device, wherein the pipe parts each comprise a first obliquely or vertically extending end face and a second obliquely or vertically extending end face, which are overlapped by the clamping device, which applies an outwardly acting radial force to the at least one single-part sealing ring or the at least one multi-part sealing ring, which are secured in a respective sealing position by an enclosing geometric triangle, by an enclosing geometric non-rectangular quadrilateral, or by an enclosing geometric rectangular quadrilateral, wherein a complementary geometry of projections and recesses arranged in alternating sequence is designed at mutually facing ends of the pipe parts in the circumferential direction.

2. The pipe connection according to claim 1, wherein the single-part sealing ring or the multi-part sealing ring has a wedge-shaped cross-section, a rectangular cross-section, a circular cross-section or an oval cross-section.

3. The pipe connection according to claim 2, wherein there is a wedge angle at the wedge-shaped cross-section of the single-part sealing ring or the multi-part sealing ring and the first sealing surface and the second sealing surface extend obliquely.

4. The pipe connection according to claim 3, wherein the wedge angle is between 5° to 30°.

5. The pipe connection according to claim 3, wherein the wedge angle is between 10° to 15°.

6. The pipe connection according to claim 1, wherein the single-part sealing ring or the multi-part sealing ring is designed of Polytetrafluoroethylene, known as PTFE, plastic material with or without fibre reinforcement, rubber, plastic material with portions of metallic materials, metal-reinforced rubber mixtures or as a purely metallic seal.

7. The pipe connection according to claim 6, wherein in the case of non-parallel end faces of the pipe parts a single-part sealing ring with a wedge-shaped cross-section is designed reinforced in such a way that said single-part sealing rings allows a radial displacement against the clamping device by means of its diameter.

8. The pipe connection according to claim 1, wherein the single-part sealing ring or the multi-part sealing ring is designed as a metal ring with a wedge-shaped cross-section with crowned sealing surfaces or as a flat sealing ring made of metallic material.

9. The pipe connection according to claim 1, wherein the multi-part sealing ring comprises a first sealing ring half and a second sealing ring half each of which has a first sealing ring half end and a second sealing ring half end which are formed complementary to each other.

10. The pipe connection according to claim 1, wherein, in an assembled state of the multi-part sealing ring before the clamping device is tightened, the first and second sealing ring half ends, which are formed complementary to each other, form a first gap and a second gap, respectively, and, in the state in which said first and second sealing ring half ends are placed on the exterior wall, form a bearing surface.

11. The pipe connection according to claim 1, wherein the projections and the recesses are arranged in uniform or in non-uniform distribution at the ends of each of the pipe parts in the circumferential direction of the exterior wall of the pipe parts.

12. The pipe connection according to claim 1, further comprising, under limited axial compression, a single-part sealing ring, which has a rectangular cross-section and is compressed between a first vertical end face as well as a second vertical end face in such a way that the complementary geometry of projections and recesses abuts against each other and radially secures the single-part sealing ring in its sealing position.

13. The pipe connection according to claim 1, wherein at least one clamp and at least one bridge with a first clamp head and a second clamp head are provided at the exterior wall of each of the pipe parts, which fix tension rings at the circumference of the pipe connection.

14. The pipe connection according to claim 13, wherein the tension rings have a first end and a second end, which are each designed thickened and have each a screw head counterpart geometry and a clamping bevel.

15. The pipe connection according to claim 1, wherein clamping devices are designed with at least one connection point and hold both pipe ends in their position by means of the pipe connection.

16. The pipe connection according to claim 15, wherein a wire-shaped measuring element extends along the exterior wall of the first pipe part and of the second pipe part.

17. The pipe connection according to claim 16, wherein the wire-shaped measuring element is held, guided, and protected by one or more adhesively bondable, mountable foam covers having a slotting in the longitudinal direction.

18. An aircraft comprising at least one pipe connection according to claim 1.

19. A Pipe connection with a first pipe part and a second pipe part, with at least one multi-part sealing ring or at least one single-part sealing ring, which is surrounded by a clamping device, wherein the pipe parts each comprise a first obliquely or vertically extending end face and a second obliquely or vertically extending end face, which are overlapped by the clamping device, which applies an outwardly acting radial force to the at least one single-part sealing ring or the at least one multi-part sealing ring, which are secured in a respective sealing position by an enclosing geometric triangle, by an enclosing geometric non-rectangular quadrilateral, or by an enclosing geometric rectangular quadrilateral, wherein the multi-part sealing ring comprises a first sealing ring half and a second sealing ring half each of which has a first sealing ring half end and a second sealing ring half end which are formed complementary to each other.

20. A pipe connection with a first pipe part and a second pipe part, with at least one multi-part sealing ring or at least one single-part sealing ring, which is surrounded by a clamping device, wherein the pipe parts each comprise a first obliquely or vertically extending end face and a second obliquely or vertically extending end face, which are overlapped by the clamping device, which applies an outwardly acting radial force to the at least one single-part sealing ring or the at least one multi-part sealing ring, which are secured in a respective sealing position by an enclosing geometric triangle, by an enclosing geometric non-rectangular quadrilateral, or by an enclosing geometric rectangular quadrilateral, wherein at least one clamp and at least one bridge with a first clamp head and a second clamp head are provided at the exterior wall of each of the pipe parts, which fix tension rings at the circumference of the pipe connection.

* * * * *